United States Patent [19]

Laird

[11] Patent Number: 5,727,909

[45] Date of Patent: Mar. 17, 1998

[54] CLOSED LOOP PNEUMATIC TRANSPORT SYSTEM

[75] Inventor: Joseph W. Laird, Lubbock, Tex.

[73] Assignee: The United States of America as represented by the Secretary of Agriculture, Washington, D.C.

[21] Appl. No.: 611,701

[22] Filed: Mar. 6, 1996

[51] Int. Cl.$^6$ ............................................. B65G 53/28
[52] U.S. Cl. .................... 406/106; 406/79; 406/168; 406/173
[58] Field of Search ................... 406/79, 106, 151, 406/152, 153, 168, 171, 172, 173

[56] References Cited

U.S. PATENT DOCUMENTS

| | | | |
|---|---|---|---|
| 2,814,531 | 11/1957 | Murray, Jr. | 406/106 |
| 3,112,139 | 11/1963 | Wildbolz et al. | 406/106 X |
| 3,809,438 | 5/1974 | Hubbard | 406/106 |

FOREIGN PATENT DOCUMENTS

| | | | |
|---|---|---|---|
| 282355 | 9/1990 | Germany | 406/153 |

OTHER PUBLICATIONS

Abernathy, G.H., Hughs, S.E., Gillum, M.N., and Lalor, W.F., *Factors for Improved Blow Box Design*, Paper No. 901029, an ASAE Meeting Presentation on Jun. 24–27, 1990.

*Primary Examiner*—Andrew C. Pike
*Attorney, Agent, or Firm*—M. Howard Silverstein; Randall E. Deck; John D. Fado

[57] ABSTRACT

A closed looped pneumatic transport unloading system in a cotton gin transports seed cotton from a trailer or module into the cotton gin. The closed looped pneumatic transport unloading system includes a fan, a cotton receiving unit, a separator, and a cyclone connected by conveying conduits to form the closed loop. The fan is positioned after the cyclone in the closed loop thereby reducing the wear on the fan. Cotton is input into the suction stream of the closed loop at the cotton receiving unit, and output from the suction stream at the separator. An air stream output from the fan is conveyed into the blow box. By providing a closed loop pneumatic transport unloading system, exhaust from this portion of the ginning process is eliminated.

15 Claims, 8 Drawing Sheets

CLOSED LOOP PNEUMATIC TRANSPORT SYSTEM

BACKGROUND OF THE INVENTION

1. Field of the Invention

The invention relates to a closed loop pneumatic transport system in a cotton gin. More particularly, the invention relates to an open inlet, closed loop pneumatic transport unloading system for transporting cotton from a truck or module into the cotton gin.

2. Prior Art

Seed cotton unloading systems remove seed cotton from the transport vehicle that delivers the seed cotton to the gin site, and feed cotton into the gin at a constant and uniform rate. An auxiliary function is to remove rocks, metal, or other hazardous material, and to remove wet, green bolls and some sand and dirt. The functions of the unloading system vary somewhat with the harvest method and with the transport and storage method used between the field and the gin. The main storage methods used for harvested seed cotton in the United States cotton industry involve trailers or modules. There are essentially two types of modern seed cotton unloading systems associated with trailer or module storage. These two types of unloading systems include: (1) pneumatic suction using swinging telescopes that remove cotton directly from the trailer or module; and (2) module disperser systems that break up the module mechanically and deposit the seed cotton onto a conveyor that delivers it to a fixed suction pickup point.

For purposes of background and completeness on cotton ginning, and specifically on seed cotton unloading systems, the reader is referred to the following handbook: Anthony, W. S. et al., *Cotton Ginner's Handbook: Agricultural Handbook No. 503*, U.S.D.A., Agricultural Research Service (December 1994). This handbook is incorporated in its entirety herein by reference.

In either type of cotton unloading system, however, it is necessary to pick up the cotton through a suction device to transfer the cotton into the gin. This use of suction to transport cotton from a conveyor belt into the ginning system is referred to as pneumatic conveying. Pneumatic conveying in cotton gins uses enormous quantities of air. It is not uncommon for a gin to use 150,000 ft$^3$ or more of air per minute in its various conveying processes. Since air weighs 0.075 lb/ft$^3$ at standard conditions, a gin can easily handle 11,250 lbs of air/min or 675,000 lb/hour. This weight of air per hour usually exceeds the total weight of seed cotton handled per hour by several fold. Consequently, these cotton unloading air systems consume over half of the total power required in a modern cotton gin. Thus, it is important to maximize the efficiency of pneumatic systems. Efficient pneumatic systems not only lessen a gin's energy costs, but also promote smooth, trouble-free ginning with a minimum of downtime.

Referring now to FIG. 1, a flow diagram of a conventional suction pickup cotton unloading system is shown generally at 11. A fan 10, such as a centrifugal fan, is used to create the suction used to transport the cotton from a conveyor belt 12 into the ginning system (shown as a dryer 20). Fan 10 draws air in through a fan inlet 9 and discharges air through a fan outlet 13. This draw of air across fan 10 creates the suction stream in unloading system 11. The pressure of the suction stream at fan inlet 9 is approximately −21 inches water gauge and the pressure at fan outlet 13 is approximately +8 inches water gauge. Therefore, in conventional systems it is necessary to have a high pressure across fan 10 of approximately 28 to 30 inches water gauge. Cotton gins use a significant amount of energy to maintain this high pressure across the fan. Also, with such a high negative pressure on the suction side of unloading system 11, leakage loss and entry and exit losses of pressure are high.

In operation, cotton is picked up from conveyor 12 into the suction stream at a suction pickup 16. The suction stream and cotton are transported through a conveying pipe to an air and cotton separator 18. Separator 18 is a machine that is designed to separate seed cotton from the conveying air in the pneumatic conveying system.

In addition to this primary function, separator 18 also removes limited quantities of dust and fine trash from the seed cotton. When used in unloading system 11, separator 18 usually requires more maintenance than when used at other locations in the gin. Uneven flow material, high negative pressures, and high trash levels in the unloading system create especially severe operating conditions for a separator.

The cotton separated from the suction air is discharged to dryer 20. The suction air and dust separated from the cotton is then passed through fan 10. A positive pressure stream is discharged from fan outlet 13. This stream is passed through a conduit to a cyclone 22 for cleaning purposes, and then is discharged into atmosphere 14.

Prior to stringent Environmental Protection Agency (EPA) air quality standards, the suction air from the fan would have been discharged directly into the atmosphere. However, due to stringent EPA standards, the air exhausted from a cotton gin must be cleaned prior to being exhausted to the atmosphere. Accordingly, at least one, and frequently more than one, cyclone is provided for cleaning the suction air before the suction air is discharged to the atmosphere.

By exhausting the air into the atmosphere, not only do EPA standards have to be satisfied, but power generated by the unloading system is lost when it is discharged from the unloading system into the atmosphere. Moreover, the EPA standards are becoming increasingly more stringent requiring the use of additional cyclones and energy to clean the air in the unloading systems prior to discharge into the atmosphere.

Additionally, as illustrated in FIG. 1, the suction air generated by fan 10 passes generally in series through unloading system 11. Because fan 10 is positioned in unloading system 11 after air and cotton separator 18, but before cyclone 22, fan 10 experiences high wear caused by the trash and dust in the air stream passing through fan 10. In addition, the inside of the conveying pipe after air and cotton separator 18 and before cyclone 22 also suffers undue wear from the trash and dust, which is being propelled at a very high speed and pressure against the inside walls of the conveying pipes.

SUMMARY OF THE INVENTION

The present invention provides a closed loop pneumatic transport system that recirculates air that otherwise would have been exhausted into the atmosphere. The closed loop pneumatic transport system includes an air mover, such as a fan, a cotton receiving unit, such as a blow box, and a separator, interconnected by transport or conveying conduits. The air mover is positioned within the loop to generate and circulate a positive pressure stream of air from its outlet into an inlet of the receiving unit, and draw a negative pressure stream through the outlet of the receiving unit to the inlet of the air mover. The system preferably further includes an air cleaner, such as a cyclone, for cleaning the air prior to recycling. Both the separator and the air cleaner are positioned downstream from the receiving unit in the system. As a result, cotton is removed from the air stream and the air is cleaned prior to passage through the air mover, thereby reducing the wear on the fan. In addition, an optional jet may also be provided at the cotton receiving unit to increase the negative pressure and improve the efficiency of system.

The invention further provides for a method of transporting cotton from an input location to an output location using the above described closed loop pneumatic transport system. In this method, transport of the cotton is effected by the air mover which generates a positive pressure air stream at its outlet and draws a negative pressure stream at its inlet. As cotton is deposited into the receiving unit, the positive pressure stream of air entering the receiving unit, and the negative pressure stream drawn by the fan at the outlet of the receiving unit, entrain or pick up the cotton, transporting it downstream to the separator. Entrainment of the cotton into the air stream may be enhanced by adding the jet adjacent to the outlet of the cotton receiving unit to increase the negative pressure. The cotton-suction stream is transported from the cotton receiving unit to the separator where the cotton is separated from the dirt/trash and the air stream. The cotton is discharged from the closed loop at a cotton outlet in the separator, while the air stream containing residual dirt and trash is conveyed into the air cleaner. The clean air from the air cleaner is subsequently discharged into the fan for recirculation into the cotton receiving unit.

An advantage of the invention is that it provides a high efficiency, reduced energy consumption closed loop pneumatic transport system for transporting cotton into a cotton gin.

Another advantage of the invention is that it reduces the cost of compliance with EPA air quality standards by eliminating at least one exhaust from the cotton gin into the atmosphere.

Another advantage of the invention is that it attains the air quality goals of the Clean Air Act for the entire cotton gin by eliminating one of its major emission sources.

Another advantage of the invention is that it provides improved energy efficiency.

Another advantage of the invention is that it reduces the wear on the fan in the system.

Another advantage of the invention is that it recirculates the cleaned air.

Another advantage of the invention is that it provides an open inlet for cotton with the necessary negative pressure characteristics required for properly entraining the cotton in the suction air.

Another advantage of the invention is that it reduces pressure across the fan within the system to at least one-half that of conventional systems.

Another advantage of the invention is that it reduces the inefficiency caused by leakage, entry, and exit losses experienced with the high negative pressure in conventional systems.

Other advantages and salient features of the invention will become apparent from the following detailed description, which, taken in conjunction with the annexed drawings, discloses preferred embodiments of the invention.

BRIEF DESCRIPTION OF THE FIGURES

The present invention is described with reference to the accompanying drawings. In the drawings, like reference numerals indicate identical and functionally similar elements.

DETAILED DESCRIPTION

Figure 2:
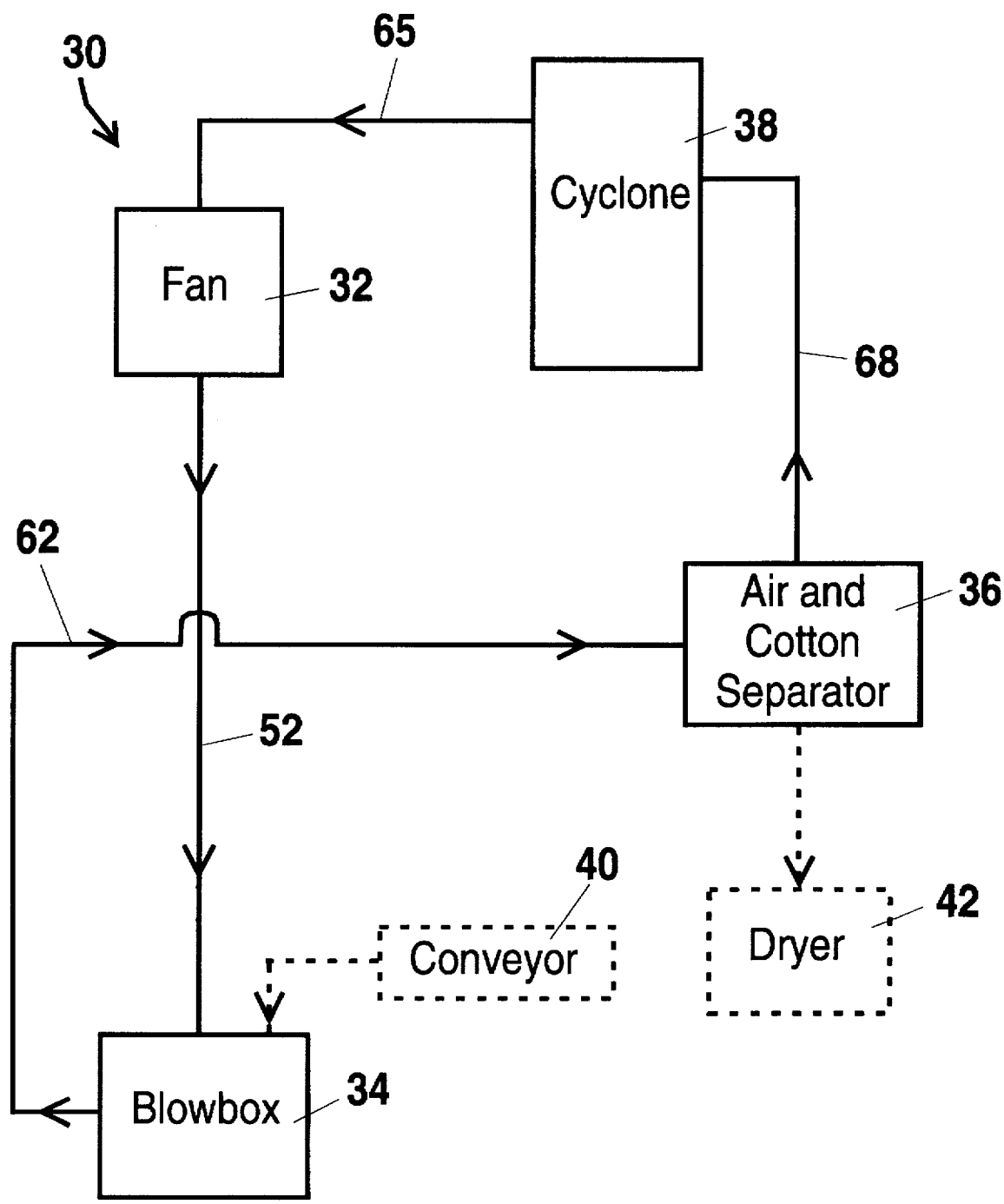
FIG. 2 shows a flow diagram of a closed loop pneumatic transport system in accordance with the present invention.

The present invention provides a closed loop pneumatic transport unloading system in a cotton gin as shown generally at 30 in FIG. 2 (hereinafter "closed loop 30"). FIG. 2 shows closed loop 30 as a flow diagram. Closed loop 30 transports seed cotton from a first location to a second location using a conveying stream of circulated and recirculated air. As shown, a conveyor 40 (shown by dashed lines) inputs cotton into closed loop 30. A dryer 42 (also shown by dashed lines) receives cotton output from closed loop 30. Conveyor 40 is supplied with cotton by a feeder, such as a module or a trailer (not shown).

Closed loop 30 includes an air mover shown as a fan 32, a cotton receiving unit shown as a blow box 34, an air and cotton separator 36, and an air cleaner shown as a cyclone 38. Fan 32, blow box 34, separator 36, and cyclone 38 are connected by conveying conduits 52, 62, 68, and 65 to form closed loop 30. Of these, conveying conduits 62, 68, and 65 are suction conveying conduits. Conveying conduits may include conventional cotton gin pipes of a diameter of approximately thirteen (13) to twenty (20) inches. The diameter of the conduits may vary depending upon the unloading capacity.

Figure 3:
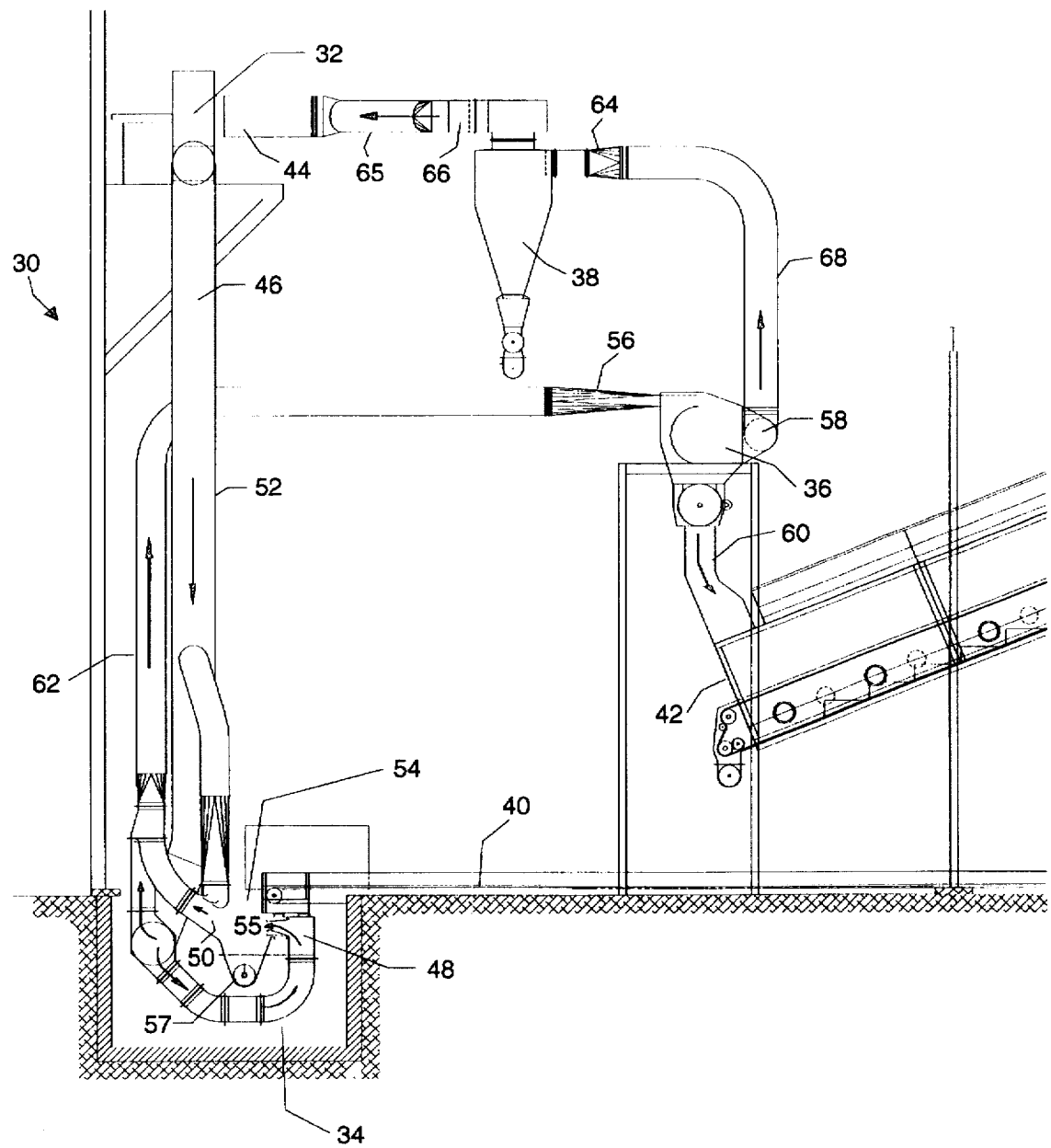
FIG. 3 shows a side view of a closed loop pneumatic transport system of the present invention as illustrated in FIG. 2.

Referring now to FIG. 3 for greater detail, fan 32 is used to generate the conveying stream of air in closed loop 30. A housing of fan 32 has a single air inlet shown as fan inlet 44 and a single air outlet shown as fan outlet 46. Fan 32 imparts a velocity on the air in closed loop 30 by drawing air into fan inlet 44 and discharging air through fan outlet 46. Fan 32 draws or sucks air into fan inlet 44 thereby creating a suction or negative pressure on a suction side of closed loop 30. The suction side of closed loop 30 includes blow box 34, separator 36, and cyclone 38, as well as conveying conduits 62, 68, and 65.

The air discharged from fan outlet 46 is positive pressure air that is fed into blow box 34. In particular, the air is passed through a fan-unit conveying conduit 52 that is connected to fan outlet 46 at one end, and is in fluid communication with an inlet 48 of blow box 34. The particulars of the preferred embodiment for the flow of the air stream between fan outlet 46 and input 48 of blow box 34 will be discussed in detail below with reference to FIG. 4.

Fan 32 may include a centrifugal or an axial flow fan, both of which are commonly used in cotton gins, but the majority of which are centrifugal fans. Operating speeds of fan 32 may vary from about 1200 to 3000 rpm.

Figure 4:
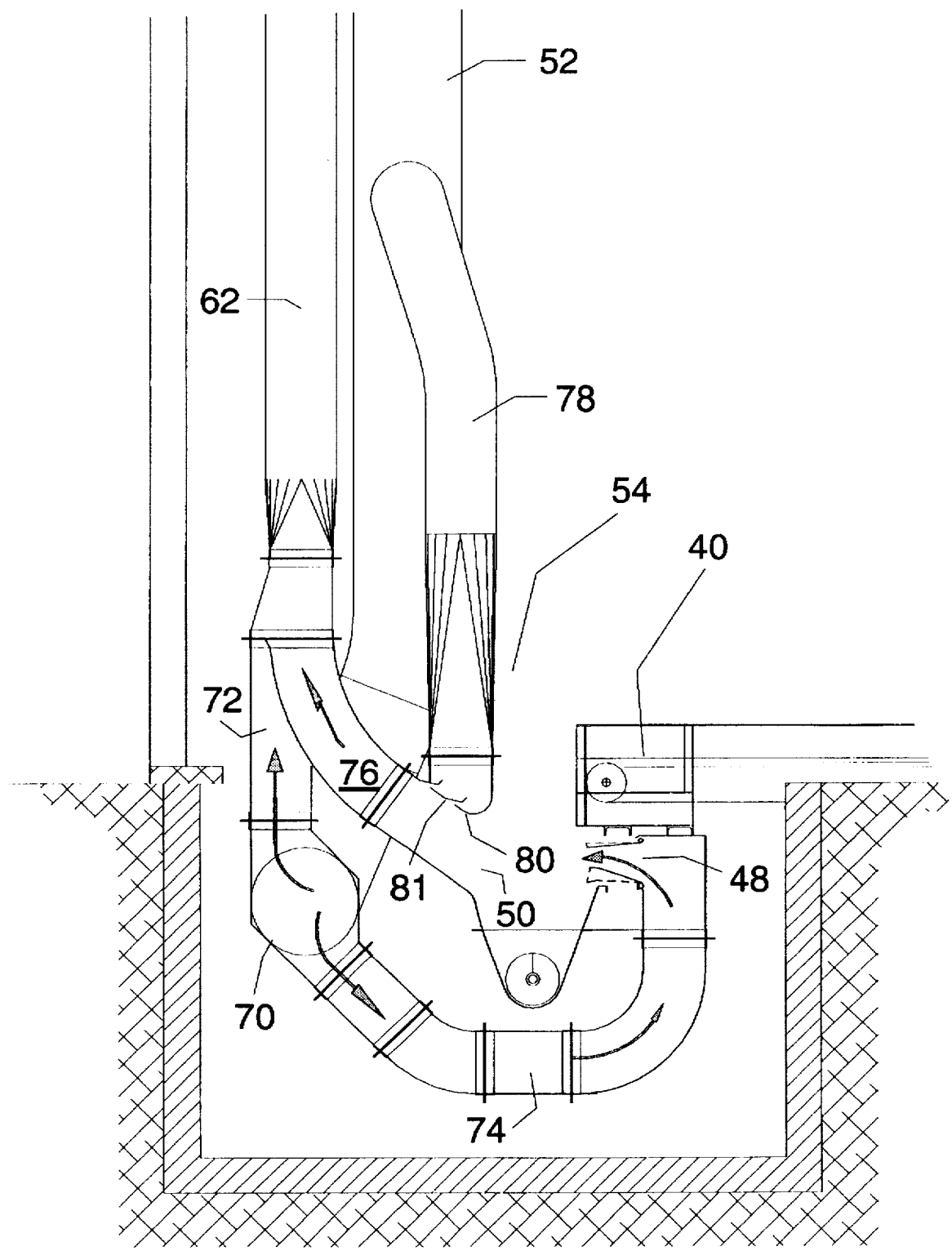
FIG. 4 shows an enlarged view of the blow box section of the system shown in FIG. 3.
Figure 5:
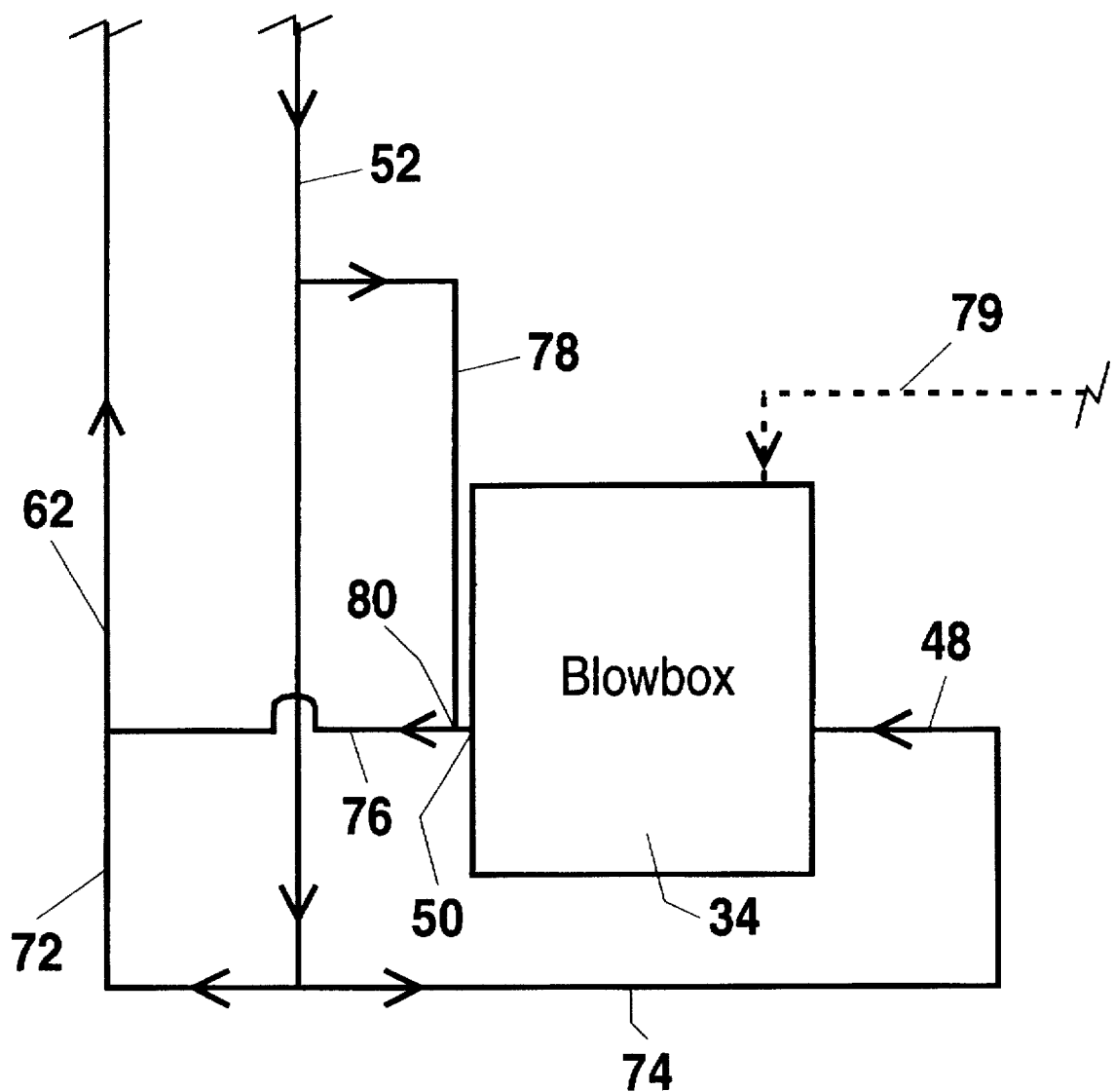
FIG. 5 shows a flow diagram of the portion of the closed loop pneumatic transport system shown in FIG. 4.

Blow box 34 is preferably a cross flow type having an inlet 48 for inputting the air stream discharged from fan 32 and an outlet 50 for discharging the air with entrained cotton. Seed cotton is supplied into blow box 34 through open inlet 54. The conveying stream input through inlet 48 passes through a mixing area 55 of blow box 34, and discharges through outlet 50 in a continuous flow. The seed cotton input into open inlet 54 of blow box 34 is entrained in the conveying stream in mixing area 55, while large trash, such as green bolls and rocks, are separated from the cotton and pass into a large trash and green boll discharge 57. A description of the blow box of the preferred embodiment as shown in FIG. 3–5 is provided hereinbelow.

The mechanism for delivery of the cotton to the blow box 34 is not critical and a variety of different devices may be used. However, for practical purposes it is envisioned that cotton will be generally supplied using a conveyor 40. Without being limited thereto, rubber belt type conveyors are typical in the art and may be readily used herein. Seed cotton is deposited on conveyor 40 from a cotton module dispersing unit in accordance with conventional practice.

Outlet 50 of blow box 34 is connected to inlet 56 of separator 36 by blow box-separator conveying conduit 62. The primary function of separator 36 is the separation of seed cotton from the conveying suction stream in closed loop 30. In addition, separator 36 also removes dust and trash from the seed cotton. Separators which are known and conventional are suitable for use herein. However, because separator 36 experiences uneven material flow, high negative pressures, and high trash levels, it must be durable.

The suction stream of air and dirt separated from the cotton in separator 36 is discharged through separator outlet 58. The cotton is discharged from separator 36 through a cotton discharge 60 for storage or input into the gin, preferably into a conventional cotton gin dryer 42.

Separator outlet 58 of separator 36 is connected to cyclone inlet 64 through a separator-cyclone conveying conduit 68. Cyclones, in general, are used as air pollution abatement equipment in cotton gins. Cyclone 38 collects the waste and the dirt from the conveying suction stream output from separator 36. In the present invention, cyclone outlet 66 is connected to fan inlet 44 by a cyclone-fan conduit 65 to form closed loop 30.

Cyclone 38 includes a cylindrical upper body, a conical lower section and a smaller center cylinder that extends from the top to just below the opening where the clean air is discharged. The trash-laden air enters tangentially near the top of cyclone 38. Centrifugal force caused by the whirling action of the trash and air pushes the trash outward and down through the conical section to a collection point below cyclone 38. The clean air moves up through a center vortex and out through the center cylinder. A properly sized, high-efficiency cyclone may collect 99.9% of the total trash introduced, and virtually 100% of the trash larger than 30 micrometers in diameter.

A variety of blow boxes have been described or are in use which may be suitable for use in the closed loop system of this invention. However, in accordance with the preferred embodiment the invention further provides a novel blow box 34 which is shown in FIGS. 4 and 5. Use of this preferred blow box allows the system to operate at substantially reduced air pressure and velocity, and hence increased efficiency, in comparison with conventional blow boxes. As shown in FIG. 4, fan-blow box conduit 52 transports the positive pressure air stream from fan outlet 46. Fan-blow box conduit 52 has a bifurcated end 70 having a first branch or end conduit 72 extending in a first direction, and a second branch or end conduit 74 extending in a second direction opposite the first direction. The air stream in fan-blow box conduit 52 is split such that approximately half the suction air passes into first end conduit 72 and the balance of the suction air passes into second end conduit 74. First end conduit 72 is connected with blow box-separator conduit 62. Second end conduit 74 of fan-blow box conduit 52 is connected to input 48 of blow box 34. Input 48 as shown includes an optional nozzle for directing and propelling conveying air through blow box 34. Blow box-separator conveying conduit 62 includes a junction conduit 76 for connection to the outlet 50 of blow box 34. Cotton entrained conveying air from blow box 34 is passed through junction conduit 76 into blow box-separator conveying conduit 62.

In a particularly preferred embodiment, fan-blow box conveying conduit 52 also includes a branched conduit 78 extending therefrom at a point upstream from bifurcated end 70. Branched conduit 78 has a distal end that is connected to junction conduit 76 at a location adjacent outlet 50 of blow box 34 to form a joint 80. As shown in FIG. 4, joint 80 includes one or more optional flow directing channels 81, which are connected to conduit 76 at an acute angle effective for directing the flow of the conveying stream from branched conduit 78 in an downstream direction toward blow box-separator conveying conduit 62 and separator 36. Without being limited thereto, channels 81 may be ducts, baffles, nozzles, or preferably slots (shown). In use, a portion of the positive pressure air stream from fan-blow box conduit 52 branches off into branched conduit 78. Directing slots 81 form a jet that induces a high velocity jet flow directed into junction conduit 76, further inducing a negative pressure in the outlet area 50 of blow box 34. This increased negative pressure assists in drawing the cotton out of blow box 34 and downstream into junction conduit 76 for transport into blow box-separator conduit 62.

FIG. 5 shows by arrows the directional flow of the conveying stream from fan-blow box conduit 52 into blow box 34, and out of blow box 34 into blow box-separator conduit 62. Dashed arrow 79 represents the input of cotton from conveyor 40 into blow box 34.

As mentioned hereinabove, conventional blow boxes may also be used in the closed loop system of this invention. Without being limited thereto, other blow boxes which are suitable for use herein are described by Abernathy et al. (1990, Factors for Improved Blow Box Design, paper no. 901029, American Society of Agricultural Engineers, St. Joseph, Mich., presented at the 1990 meeting of The American Society of Agricultural Engineers, Columbus, Ohio, Jun. 24–27, 1990), the contents of which are incorporated by reference herein. Regardless of its design, the blow box should be sized to have crossing stream air velocity that is at least as great as that recommended for normal suction conveying. For more severe conditions, such as the handling of wet cotton at high feed rates, it is advisable to increase these recommended velocities by 30–40% in the blow box. In addition, blow boxes such as those described by Abernathy et al. may use very high-velocity air streams to open single-lock seed cotton for more effective drying and cleaning. Inlet air velocities in the range of about 12,000 to 20,000 feet/min. are normally used in this type of blow box.

Operation

Referring to FIG. 3, in operation, closed loop 30 circulates and recirculates the conveying stream of air therethrough. Cotton is input into closed loop 30 for transport to separator 36 where it is then discharged into dryer 42. Specifically, cotton from the feeder (module or trailer) is disposed on conveyor 40. Then conveyor 40 conveys cotton to blow box 34 where cotton is entrained in the conveying stream. With the assistance of the negative pressure created by flow directing slots 81, the cotton-conveying stream in blow box 34 is swiftly sucked up into junction conduit 76 and into blow box-separator conduit 62 for transport to separator 36. At separator 36, the cotton is discharged from the suction stream through cotton discharge 60, and the suction stream and dirt/trash is transported through separator-cyclone conduit 68 into cyclone 38 where the dirt/trash is cleaned out of the suction stream. Then, the clean suction stream is passed through fan 32. Fan outlet 46 then circulates the positive pressure stream output therefrom into blow box 34.

Figure 1:
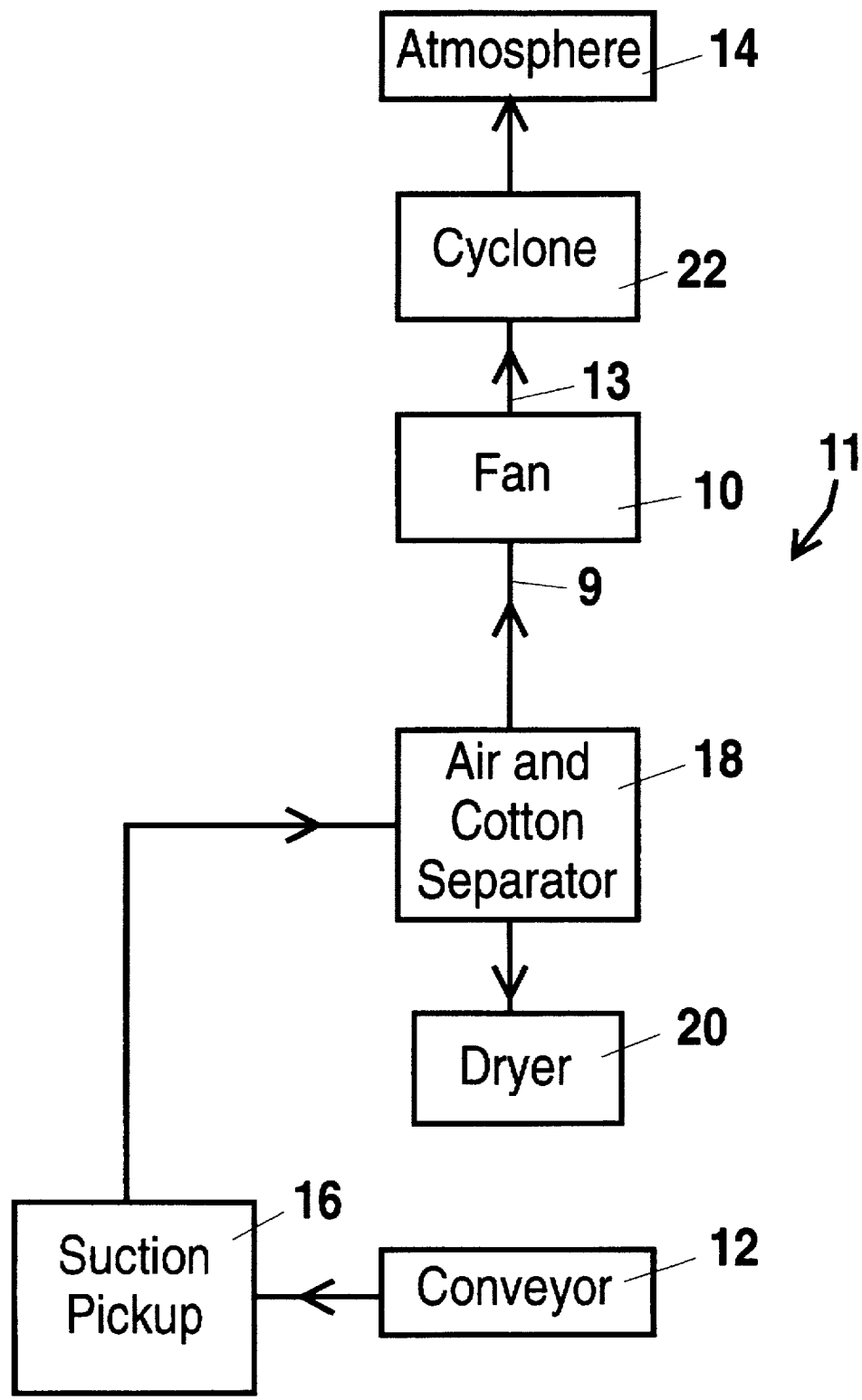
FIG. 1 shows a prior art flow diagram of a conventional unloading system.

In the present invention, the pressure across the fan is significantly reduced as compared to conventional systems. In a conventional system as shown in FIG. 1, the pressure across fan 10 is 28 to 30 inches water gauge. Specifically, the pressure at fan inlet 9 is approximately −21 inches water gauge and the pressure at fan outlet 13 is +8 inches water gauge. With this high pressure across fan 10, a large horsepower (Hp) fan motor of approximately 200 Hp is necessary to achieve a conveying velocity of approximately 4,500 to 6,000 feet per minute (fpm) through the system, which is necessary to operate the unloading system. Moreover, the high negative pressure in unloading system 11 increases leakage losses in the pipes and machine, and the entry and exit losses.

In contrast, with the present invention configured as closed loop 30, without the jet created by flow directing slots 81, the pressure across the fan is reduced to 15 inches water gauge (approximately −7.5 inches water gauge at the fan inlet and +7.5 inches water gauge at the fan outlet). By providing the jet created by flow directing slots 81, the pressure across the fan is further reduced to 6 inches water gauge (approximately −3 inches water gauge at the fan inlet and +3 inches water gauge at the fan outlet). With the low pressure across the fan, a smaller horsepower (Hp) fan motor of approximately 60 Hp can be used to achieve the same conveying velocity as in conventional systems; velocities of 4,500 to 6,000 feet per minute (fpm) are generated.

In addition, with the present invention, the conveying stream is transported through the closed loop at a significantly lower negative pressure than in conventional systems. By significantly reducing the negative pressure in the closed loop, the leakage, exit, and entry losses are also reduced. For clarity, if the delta between: 1) the pressure at the leakage, exit, and entry points, which may be, for example, atmospheric pressure; and 2) negative pressure is reduced then the speed and degree of pressure loss from the closed loop can be reduced to slow leaks. The efficiency of the closed loop is thereby improved.

Furthermore, by recirculating the conveying air through the closed loop, discharge to the atmosphere is eliminated. Thus, compliance with EPA standards in the unloading section of the cotton gin is facilitated significantly, and costs associated with this compliance are greatly reduced.

Further still, with the present invention, the fan is positioned after the air cleaner (cyclone). Therefore, clean air is passed through the fan rather than dirty air from the separator. This reduces the wear on the fan, thereby increasing the life of the fan. The abrasiveness of the air-trash mixture from the separator on the fan in conventional systems constitutes a large part of the maintenance costs of a gin.

Alternate Embodiments

Figure 6:
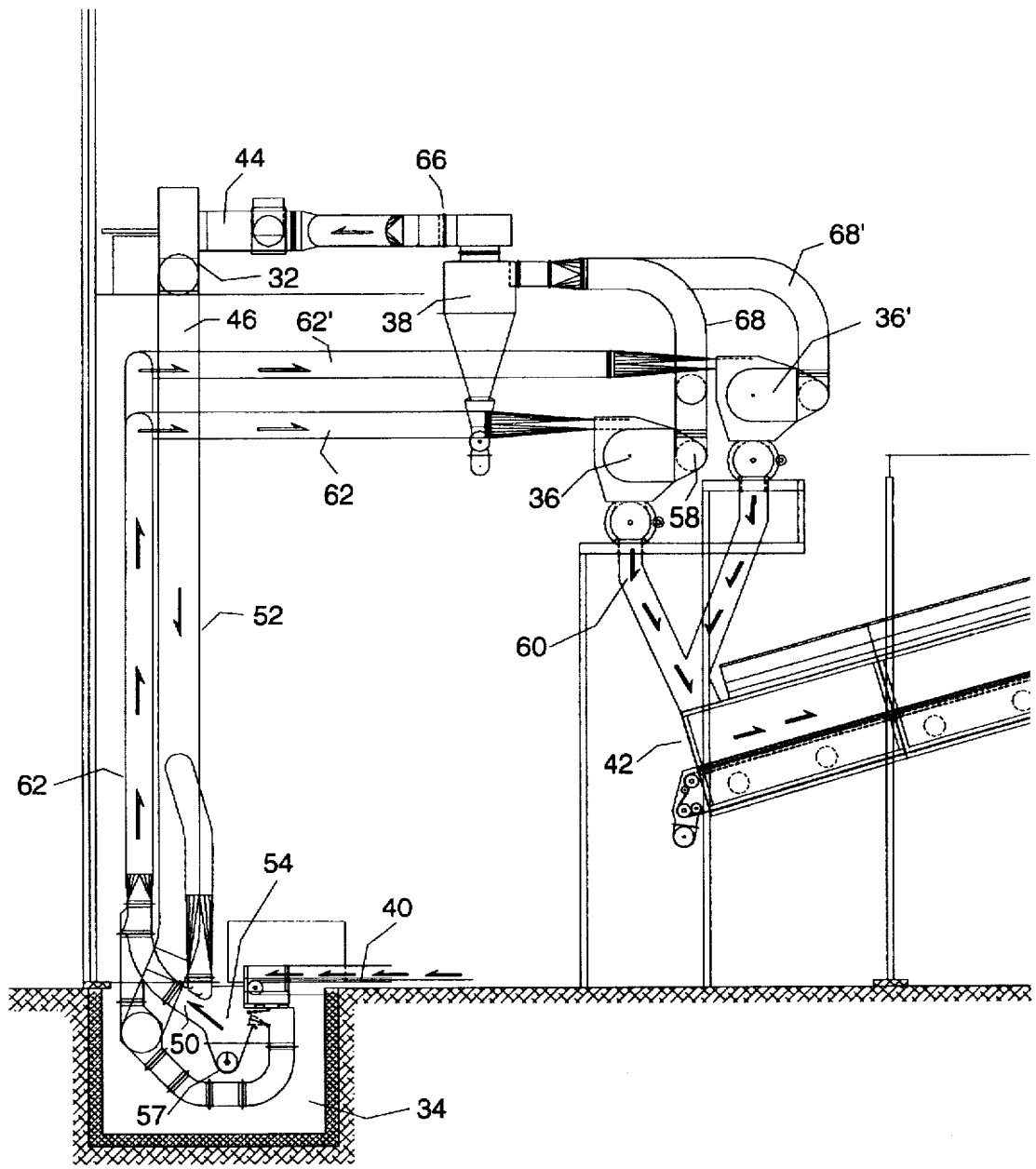
FIG. 6 is a side view of a split stream suction unloading system.
Figure 7:
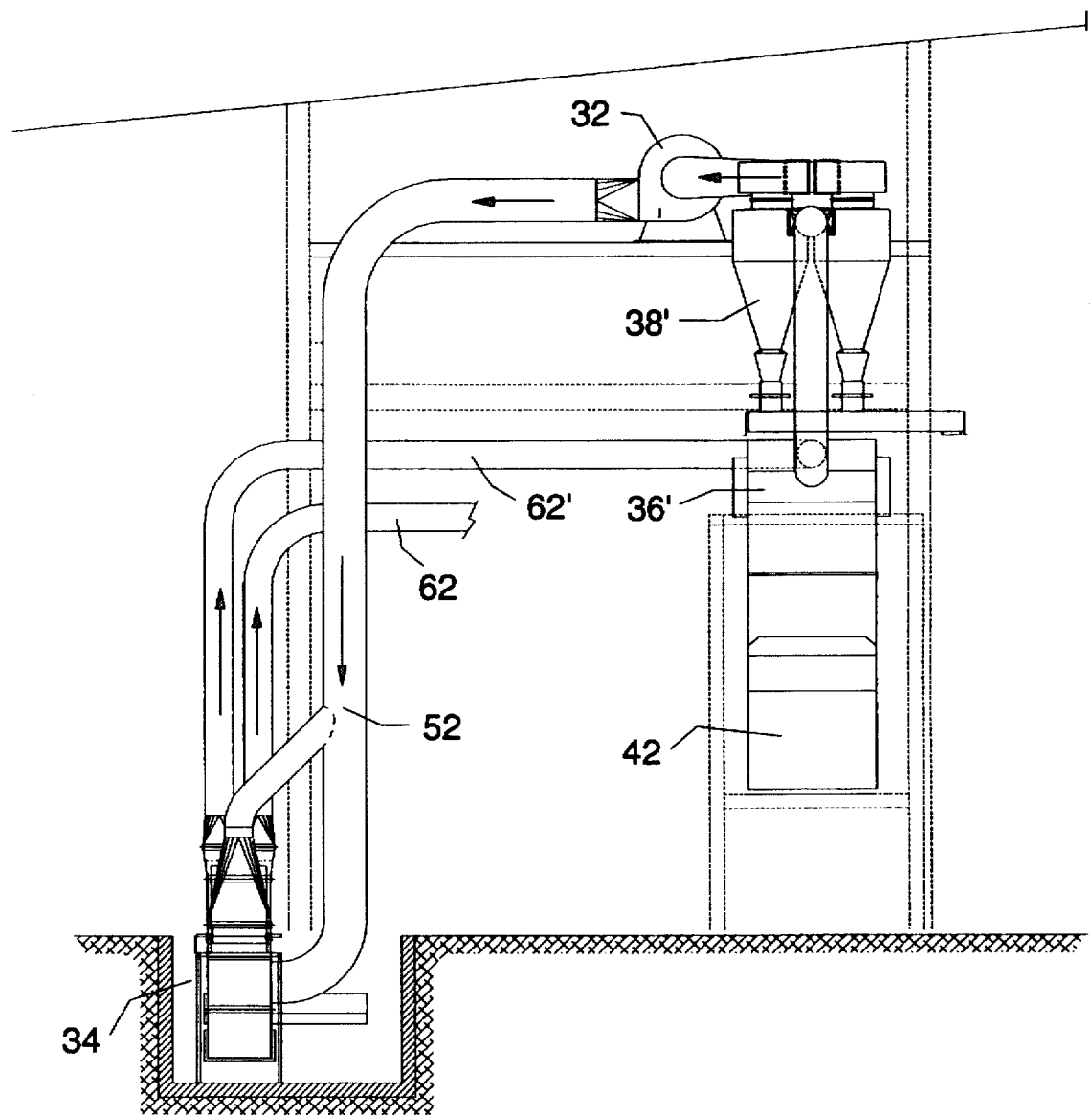
FIG. 7 is an end view of the split stream suction unloading system shown in FIG. 6 with separator and cyclones from one stream omitted for clarity.
Figure 8:
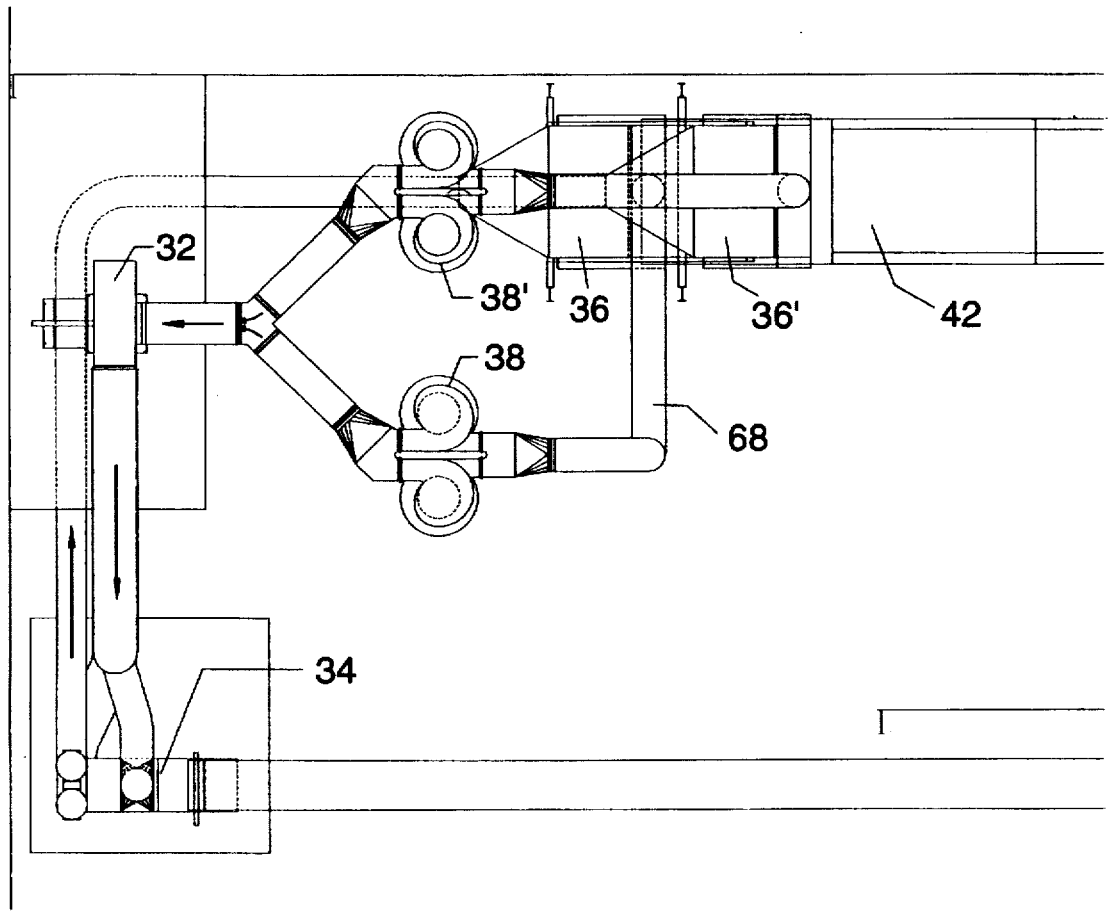
FIG. 8 is a top view of the split stream suction unloading system shown in FIG. 6.

Referring now to FIGS. 6—8, a closed loop pneumatic cotton handling system for a split stream suction unloading system will be discussed. The split stream suction unloading system is similar to the suction unloading system shown and discussed with reference to FIGS. 2–5. However, the split stream suction unloading system includes a second cotton and suction air blow box-separator conveying conduit 62' for transporting cotton and suction air to a second separator 36'. Accordingly, a second cyclone 38' is provided for receiving suction air and dirt/trash from a second separator-cyclone conveying conduit 68'. Specifically, FIG. 6 shows a side view of this embodiment of the invention, FIG. 7 shows an end view of this embodiment of the invention, and FIG. 8 shows a top view of this embodiment of the invention.

In another alternate embodiment, the closed loop system of the invention could be used to pick up and transport cotton from virtually any container or transport device. For example, rather than using a system having a blow box, the cotton may be picked up directly from a trailer (i.e., the trailer is the receiving unit). In this embodiment, the fan-blow box conduit 52 and the blow box-separator conduit 62 may be movably positioned within the trailer. Conduit 52 may be free or attached to conduit 62, but in any event should follow conduit 62 to direct the positive pressure air stream to the point where the suction conduit 62 is picking up cotton.

Conclusion

While various embodiments of the present invention have been described above, it should be understood that they have been presented by way of example only, and not limitation. For example, the present invention could be used to transport solids other than cotton, including but not limited to plant material, crops, wood chips, plastic pellets, or waste. Thus, the breadth and scope of the present invention should not be limited by any of the above-described exemplary embodiments, but should be defined only in accordance with the following claims and their equivalents.

What is claimed is:

1. A closed loop pneumatic transport system for transporting solids from a first location to a second location, said system comprising:

an air mover having an inlet and an outlet, said air mover being effective for generating a positive pressure stream of air;

a receiving unit for the solids having an inlet in communication with the outlet of said air mover to input said positive pressure stream of air, and an outlet, wherein said receiving unit is effective for mixing said stream of air and said solids and discharging a mixture of said air and said solids through said outlet of said receiving unit;

a first conduit connecting the outlet of said air mover and the inlet of said receiving unit;

a separator having an inlet in communication with the outlet of said receiving unit to receive said mixture, a first outlet in communication with the inlet of said air mover, and a second outlet, wherein said separator is effective for separating the solids from the air in said mixture, discharging the solids from said second outlet of said separator, and discharging the air having the solids removed therefrom through said first outlet of said separator;

a second conduit connecting the outlet of said receiving unit and the inlet of said separator; and a third conduit connecting the first outlet of said separator and the inlet of said air mover;

wherein said first conduit is bifurcated and includes a first branch connecting the outlet of said air mover and the inlet of said receiving unit, and a second branch connecting the outlet of said air mover and said second conduit, and further wherein said first conduit additionally comprises a branched conduit branched from said first conduit and having a distal end connected to said second conduit.

2. A system according to claim 1 wherein said inlet of said receiving unit includes a nozzle for directing and propelling the air from said first branch through said receiving unit.

3. A system according to claim 1 wherein said inlet of said receiving unit is positioned opposite from said outlet of said receiving unit.

4. A system according to claim 3 wherein said receiving unit comprises a cross flow blow box.

5. A system according to claim 1 wherein said first conduit is bifurcated into said first branch and said second branch such that the air flow into said first branch is approximately the same as the air flow into said second branch.

6. A system according to claim 1 wherein said branched conduit is branched from said first conduit upstream from said first branch and said second branch.

7. A system according to claim 1, wherein said distal end of said branched conduit and said second conduit are connected at a joint, said joint having flow directing channels effective for directing a flow of said stream of air into said second conduit toward said separator.

8. A system according to claim 7, wherein said flow directing channels are effective for inducing a negative pressure at said receiving unit outlet when said stream of air is passed through the system and said flow of said stream of air passes through said flow directing channels.

9. A system according to claim 7, wherein said joint is adjacent to the outlet of said receiving unit.

10. A system according to claim 1 wherein said receiving unit further comprises a second inlet for receiving said solids.

11. A system according to claim 1 further comprising an air cleaner intermediate between the first outlet of said separator and the inlet of said air mover, said air cleaner having an inlet in communication with the first outlet of said separator, and a first outlet in communication with the inlet of said air mover, wherein said air cleaner is effective for removing dirt and trash from the air received from the first outlet of said separator, and discharging cleaned air through said outlet of said air cleaner.

12. A system according to claim 11, wherein said air mover comprises a fan, said receiving unit comprises a blow box, and said air cleaner comprises a cyclone.

13. A method for transporting solids from an input location to an output location using a closed loop pneumatic system, comprising the steps of:

depositing the solids into a receiving unit of said closed loop pneumatic system, said receiving unit having an inlet and an outlet;

generating a positive pressure stream of air using an air mover of said closed loop pneumatic system;

bifurcating said positive pressure stream of air from said air mover into a first portion and a second portion;

branching a third portion of said positive pressure stream of air from said air mover;

directing said first portion of said stream of air into said receiving unit through the inlet in contact with said solids, thereby entraining said solids into said stream of air, and discharging a stream comprising the air and said solids from said receiving unit through the outlet;

combining said second portion of said stream of air with the stream of air and solids discharged from said receiving unit;

passing said third portion of said stream of air through flow directing channels adjacent to the outlet of said receiving unit, inducing a negative pressure at the outlet of said receiving unit when said third portion is passed therethrough to assist in entraining the solids into said stream of air in said receiving unit;

directing said stream of air and solids from the receiving unit to a separator of said closed loop pneumatic system and separating said solids;

discharging a stream of the air having the solids removed therefrom from a first outlet of said separator;

discharging the solids from a second outlet of said separator; and recycling said stream of air discharged from said separator to said air mover to generate said positive pressure stream of air.

14. A method according to claim 13 wherein said solids deposited into said receiving unit and entrained into said stream of air are cotton.

15. A method according to claim 13 further comprising directing said stream of air discharged from said separator through an air cleaner of said closed loop pneumatic system prior to recycling to said air mover, said air cleaner removing dirt and trash from said stream of air discharged from said separator.

* * * * *